United States Patent
Kim

[11] Patent Number: 5,291,313
[45] Date of Patent: Mar. 1, 1994

[54] AUTOMATIC CONTRAST CORRECTIN USEFUL IN VIDEO-TO-PRINT APPARATUS

[75] Inventor: Young G. Kim, Suwon, Rep. of Korea

[73] Assignee: Samsung Electronics Co., Ltd., Suwan, Rep. of Korea

[21] Appl. No.: 26,142

[22] Filed: Feb. 26, 1993

[30] Foreign Application Priority Data

Feb. 27, 1992 [KR] Rep. of Korea ............. 92-3088

[51] Int. Cl.$^5$ ............................................. H04N 1/46
[52] U.S. Cl. ..................... 358/521; 358/538; 358/523; 348/678
[58] Field of Search ............. 358/27, 28, 36, 169, 358/538, 523, 519-521, 21 R; H04N 9/77

[56] References Cited

U.S. PATENT DOCUMENTS 4,887,150 12/1989 Chiba et al. ............... 358/523
5,119,187 6/1992 Ikeda et al. ................ 358/538 X Primary Examiner—Mark R. Powell
Attorney, Agent, or Firm—Sughrue, Mion, Zinn, Macpeak & Seas

[57] ABSTRACT

Disclosed is an automatic contrast correction method and apparatus for optimizing contrast of a picture screen. There is included an effective picture screen extractor for extracting video data corresponding to the effective picture screen among video data in the picture screen, a plurality of amplifiers for receiving the video data and amplifying the received video data for output, and a microcomputer for comparing the average value which is calculated from the video data of the effective picture screen with a previously set reference value and regulating an amplification factor by supplying a control signal to the amplifiers according to the comparison result. Even if video images photographed toward the sun are printed, it can be prevented from being printed in a dark state, thereby obtaining a good quality of picture.

8 Claims, 2 Drawing Sheets

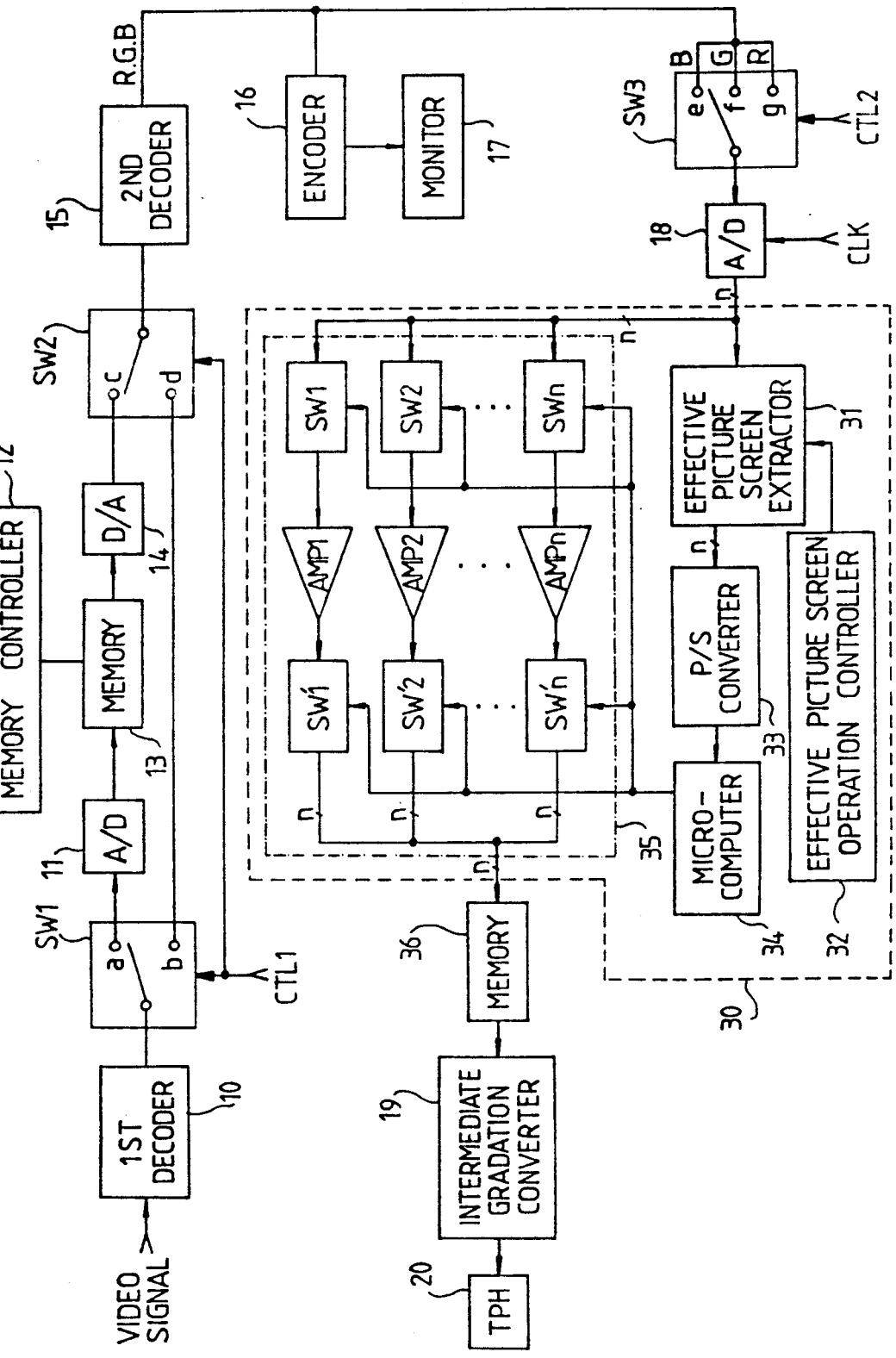

AUTOMATIC CONTRAST CORRECTIN USEFUL IN VIDEO-TO-PRINT APPARATUS

BACKGROUND OF THE INVENTION

The present invention relates to an automatic contrast correction method and apparatus thereof, and more particularly to a method and apparatus for automatically correcting contrast to maintain optimum contrast of a reproduced picture for use in a color video printer.

A color video printer is a printing apparatus which prints on paper still or captured pictures that are selected or captured from moving pictures photographed by camera recorders ("camcorders"). s A conventional color video printer comprises a first decoder for converting a reproduced video signal into color difference signals, memories for storing color difference signal data of the pictures to be printed, a second decoder for converting the color difference signal data supplied from the memories into R, G and B signals, an encoder for converting the R, G and B signals into a composite video signal and supplying it to a monitor, line memory means in which the R, G and B signals are sequentially selected by a three-input-to-one output switch and the selected signals are converted into digital data so as to be stored in line memories, an intermediate gradation converter for converting the data supplied from the line memory means into a physical signal, and a thermal printing head (TPH) in which a heat generation amount is adjusted by an output of the intermediate gradation converter.

FIG. 1 is a block diagram of a color signal processor in a conventional color video printer.

In FIG. 1, a switch SW3 includes three inputs e, f and g, which receive the respective different color signals from a decoder (not shown) for converting the color difference signal data of a user's desired still picture or moving picture to be printed. That is, inputs e, f and g are B, G and R signals, respectively. Then, switch SW3 sequentially selects the R, G and B signals by a switch control signal CTL2 and outputs the selected signal. First, if the B signal is input through input e in switch SW3, it is sampled by a clock CLK in an A/D converter 18. That is, as shown in FIG. 2, a pulse is generated by clock CLK at the location of "$\alpha$," so that all data ($\alpha_1, \alpha_2, \ldots, \alpha_{525}$) at the location thereof is sampled by the clock pulse. That is, the clock pulses are in time coincidence with the positions $\alpha, \ldots \alpha_{25}$ of a roster type scan of the picture to be presented; said picture being presented in the form of B, G and R signals input to switch SW3. The sampled data is stored in one of two line memories through a switch SW4. First and second line memories 41 and 42 are controlled by a line memory controller 43. Switches SW4 and SW5 are simultaneously controlled by a switch control signal CTL3. If terminals h and j are respectively selected in switches SW4 and SW5, the sampled data output from A/D converter 18 passes through switch SW4 and is stored in a first line memory 41 under the control of line memory controller 43. Then, the data which is stored in first line memory 41 passes through switch SW5 under the control of line memory controller 43 and is supplied to an intermediate gradation converter 19. Then, intermediate gradation converter 19 outputs a signal having a pulse width that varies according to the digital data input signal supplied from switch SW5 and supplies it to TPH 20. TPH 20 regulates a heat generation amount according to the signal supplied from intermediate gradation circuit 19. As described above, the color signal data at the location of "$\alpha$" which is sampled in A/D converter 18 is supplied to intermediate gradation converter 19 and TPH 20 through first line memory 41, thereby being printed on the paper, etc.

After the color signal data of a first line which is sampled at the location of "$\alpha$" is completely printed, the clock pulse is input at the location of "$\beta$", so that all data ($\beta_1, \beta_2, \ldots, \beta_{525}$) at the location of "$\beta$". is sampled. If terminals i and k are respectively selected in switches SW4 and SW5 by switch control signal CTL3, second line memory 42 is accessed. The sampled data at the location of "$\beta$" is stored in second line memory 42 through switch SW4, and then is supplied to intermediate gradation circuit 19 and TpH 20 through switch SW5, so that the color signal data of a second line is printed on the paper.

As described above, the sampled data at a plurality of location is sequentially printed. Thus, in effect, an entire picture defined only by color signal B is printed, line by line, on the print paper by this process. Generally, 500 to 600 lines of data are printed in this manner in a single color.

After printing with respect to the B signal is accomplished, switch SW3 receives the G signal through input f by switch control signal CTL2. Then, the G signal supplied to A/D converter 18 through switch SW3 is printed through the same procedure as in the case of the B signal. After printing with respect to the G signal is accomplished, switch SW3 receives the R signal through input g by switch control signal CTL2. Then, the R signal is printed through the same procedure as in the case of the B and G signals. In this manner, the respective color signals are printed in turn, so that all color signal data in one picture screen is printed. Here, colors of Yellow, Magenta and Cyan are printed by the B, G and R signals, respectively.

However, in such a conventional color video printer, when the images which are photographed toward the sun are produced and printed, the whole printed images have the tendency of growing dark.

SUMMARY OF THE INVENTION

Therefore, to solve the above problems, it is an object of the present invention to provide an automatic contrast correction method capable of obtaining good quality pictures when color images photographed toward the sun are printed.

It is another object of the present invention to provide an automatic contrast correction apparatus which is realized in hardware to perform the aforesaid automatic contrast correction method for color image. To accomplish the first object of the present invention, there is provided an automatic contrast correction method comprising the steps of:

sequentially receiving respective color signals of video signals and converting the received signals into digital data; receiving the digital data and extracting the data corresponding to a previously set effective picture screen; calculating an average value of color signals with respect to the extracted data; comparing the average value with a reference value which is previously set so as to have an optimized contrast; and amplifying the digital data by a different amplification factor according to the compared result. There is also provided an automatic contrast correction apparatus comprising:

an analog-to-digital converter for sequentially receiving respective color signals of video signals and converting the received signal into digital data; memory means for storing the digital data; amplification means in which a plurality of amplifiers having different amplification factors is connected in parallel between the analog-to-digital converter and the memory means and each of the amplifiers is connected with switching means; means for receiving the digital data supplied from the analog-to-digital converter and extracting data corresponding to a predetermined effective picture screen; and a microcomputer for calculating an average value of data corresponding to the effective picture screen supplied from the effective picture screen extraction means, comparing the average value with a predetermined reference value corresponding to an optimized contrast, and driving one of the plurality of amplifiers according to the compared result.

BRIEF DESCRIPTION OF THE DRAWINGS

FIG. 3 is a block diagram of a color video printer adopting one embodiment of an automatic contrast correction apparatus according to the present invention.

DETAILED DESCRIPTION OF THE PREFERRED EMBODIMENT

Figure 1:
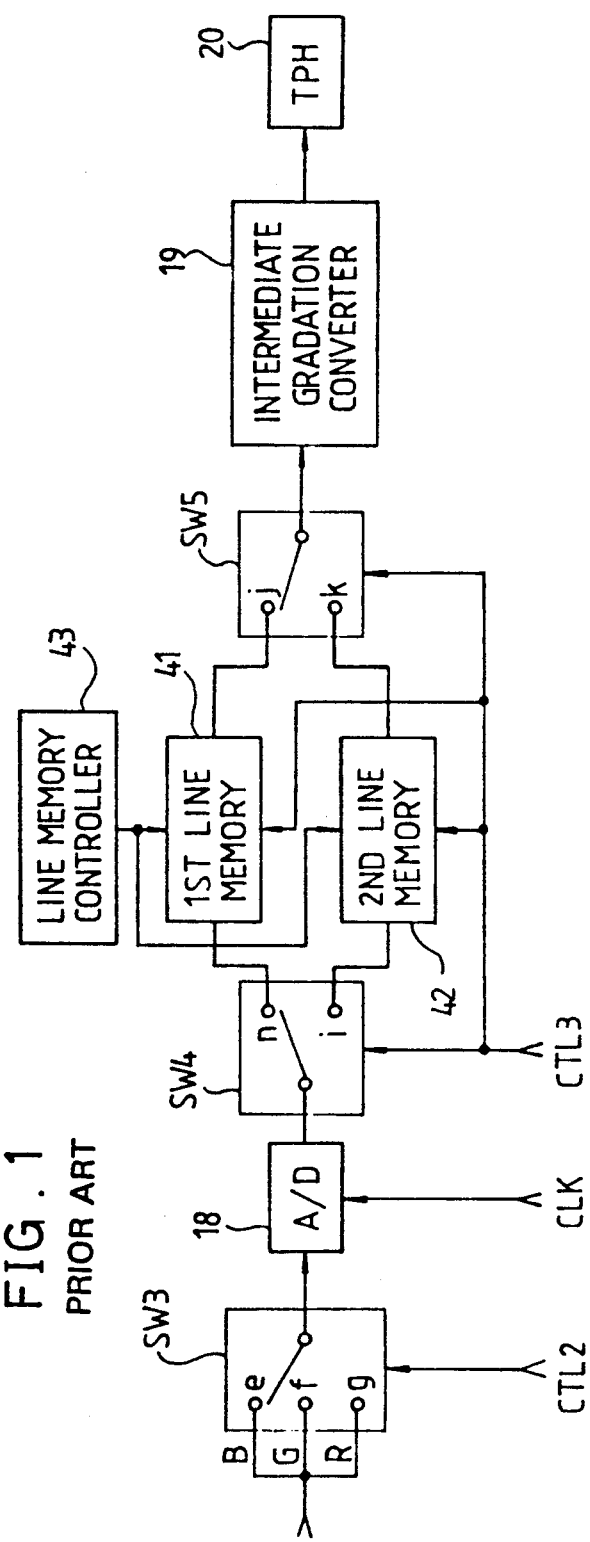
FIG. 1 is a block diagram of a conventional color signal processor provided in a general color video printer.
Figure 2:
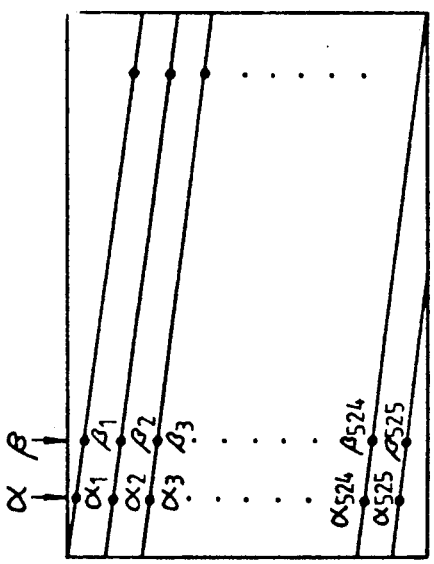
FIG. 2 is a schematic diagram showing a sampling method of video signals in the apparatus of FIG. 1.

A preferred embodiment of the present invention will be described below in more detail with reference to the accompanying drawings.

In FIG. 3, a video signal which is separated into luminance and color signals are decoded into color difference signals R-Y and B-Y in decoder 10 and then the decoded signal is supplied to a first switch SW1. A switching operation of first switch SW1 is controlled by a switch control signal CTL1 supplied from a controller (not shown). When the color difference signal supplied from first decoder 10 is a signal in the moving picture screen, video data corresponding to a selected picture is stored in a memory to capture the picture to be printed. Thus, in the case of a moving picture, the input of first switch SW1 is connected to an output "a" so that the color difference signal supplied from first decoder 10 is input to A/D converter 11. The color difference signal digitized in first A/D converter 11 is stored in memory 13 under control of memory controller 12. The color difference signal stored in memory 13 passes through D/A converter 14 and is converted into an analog signal for transmission to a second switch SW2. At the same time, second switch SW2 is controlled by switch control signal CTL1, as in the case of the first switch SW1. In the case of a moving picture input to decoder 10, the output of second switch SW2 is connected to an input "c", so that the color difference signal supplied from D/A converter 14 is supplied to second decoder 15.

On the other hand, when the input to decoder 10 is not a moving picture, but is a still picture, the color difference signal of the corresponding picture need not be further stored in the memory 13. Thus, in case of a still picture input, the input of first switch SW1 and the output of second switch SW2 are connected to terminals "b" and "d", respectively, by switch control signal CTL1. In this case, the color difference signal supplied from first decoder 10 is supplied to second decoder 15 without passing through memory 13.

Second decoder 15, which receives the color difference signal via two paths, converts the input color difference signal into R, G and B signals. The R, G and B signals supplied from second decoder 15 are supplied to an encoder 16 and a third switch SW3, simultaneously. Third switch SW3 corresponds to switch SW3 in FIG. 1. Encoder 16 receives the R, G and B signals and converts them into a composite video signal, which may be viewed by the operator on a monitor 17. Third switch SW3 sequentially selects the R, G and B signals according to the printing order of each of the respective color signals by switch control signal CTL2 in the manner as previously described. The R, G and B signals which are selected in third switch SW3 are converted into digital data in second A/D converter 18, to then transmit it to an automatic contrast correction apparatus 30.

The color signal which is converted into n digital data in second A/D converter 18 is supplied to an effective picture screen extractor 31 and n switches (SW$_1$, SW$_2$, ..., SW$_n$) in automatic contrast correction apparatus 30, respectively. Effective picture screen extractor 31 extracts data corresponding to an effective picture screen from the digital data supplied from second A/D converter 18 under control of an effective picture screen operation controller 32. Here, a magnitude of the effective picture screen is set in the central part of the whole screen within a predetermined magnitude. In other words, since the user focuses on the center of the object to be photographed, it is sufficient to use the contrast of the effective picture screen in evaluating the contrast of the whole screen. Generally, the magnitude of the effective picture screen is set as the middle portion of the whole screen, respectively exclusive of one forth length from the edges of top, bottom, left and right sides. As described above, under control of an effective picture screen operation controller 32, an effective picture screen extractor 31 extracts only data corresponding to the effective picture screen from the input color signal data of the whole picture screen, so that the effective picture screen extractor 31 supplies the extracted data to a parallel-to-serial convert 33.

Since the number of terminals of microcomputer 34 is less than the number of parallel outputs of the effective picture screen extractor 31, parallel-to-serial converter 33 converts the parallel data into serial data and supplies the converted data to microcomputer 34. Microcomputer 34 serially receives the digital data corresponding to the effective picture screen and calculates an average value of the input data. Assuming that the number of pixels of the effective picture screen is m, the average value is obtained by dividing the total sum of the data corresponding to m pixels by m. The average value of the effective picture screen obtained by this process is compared with a reference value which is stored in microcomputer 34 in advance. The reference value is set as an average value of the effective picture screen sufficient for obtaining a picture having an optimized contrast and is stored in microcomputer 34 in advance. As described above, the average value is compared with the reference value, with a result that an amplification factor is determined with respect to the magnitude of the color signal. Each of the amplifiers AMP1 through AMPn has a different amplification factor. The desired amplifier (and amplification factor) is selected by the action of microcomputer 34 in actuating a selected one of switches SW$_1$-SW$_n$ and a correspondingly selected one of switches SW'1-SW'n. That is, microcomputer 34 compares the average value with the reference value, and turns on the switches which are connected to both the ends of the amplifier corresponding to the amplification factor resulting from the comparison result by the control signal. Accordingly, the color signal supplied to color signal amplification portion 35 is amplified by an amplification factor which is selected by microcomputer 34. The amplified digitized color signals are then transmitted to memory 36. Then, the color signal data sorted in memory 36 passes an intermediate gradation converter and a TPH and is printed as in the conventional color video printer.

As described above, the automatic contrast correction method and apparatus in the color video printer according to the present invention sets a reference value of the contrast with respect to the effective picture screen and amplifies video data of the respective picture in an appropriate amplification factor so as to be close to the reference value, thereby preventing the pictures from being printed in a dark state as in the conventional method and apparatus even though video images photographed toward the sun are printed Thus, good quality images can be obtained.

What is claimed is:

1. An automatic contrast correction apparatus for correcting the contrast of a picture represented by color video signals, comprising:
   an analog-to-digital converter for sequentially receiving said color video signals and converting said received signals into digital data;
   memory means for storing said digital data;
   amplification means comprising a plurality of amplifiers having different amplification factors switchably connected in parallel between said analog-to-digital converter and said memory means;
   extracting means for receiving said digital data supplied from said analog-to-digital converter and extracting data therefrom corresponding to a predetermined effective picture screen; and
   microcomputer means responsive to said extracted data and a predetermined reference value for calculating an average value of the color signal data supplied from said extraction means, comparing said average value with said predetermined reference value corresponding to an optimized contrast, and switchably connecting one of said plurality of amplifiers between said analog to digital converter and said memory means depending upon the compared result.

2. An automatic contrast correction apparatus according to claim 1, further comprising a parallel-to-serial converter connected between the output of said extraction means and the input of said microcomputer for converting parallel data supplied from said extraction means into serial data.

3. An automatic contrast correction apparatus according to claim further comprising an effective picture screen operation controller connected to said extraction means for setting a magnitude of the effective picture screen necessary for extraction of the data in said effective picture screen extraction means.

4. An automatic contrast correction apparatus according to claim 1, wherein said amplification means comprises:
   a plurality of first switches which are connected to the output of said analog-to-digital converter in parallel, respectively, so as to perform switching operations according to a control signal supplied from said microcomputer; and
   a plurality of second switches of which the respective inputs are connected to outputs of said plurality of amplifiers for receiving respective signals supplied through said plurality of first switches, and amplifying respective input signals by respective specific amplification factors, and of which the respective outputs are connected to an input of said memory in parallel, so as to perform switching operations according to said control signal supplied from said microcomputer.

5. An automatic contrast correction method for correcting the contrast of a picture represented by color video signals comprising the steps of:
   (a) sequentially receiving respective color video signals and converting the received signal into digital data;
   (b) receiving the digital data and extracting the data corresponding to a previously set effective picture screen;
   (c) calculating an average value of color signals with respect to the extracted data;
   (d) comparing the average value with a reference value which is previously set so as to have an optimized contrast; and
   (e) amplifying the digital data by a selected one of several predetermined amplification factors, selected based on the compared result.

6. An automatic and extraction contrast correction method according to claim 5, wherein the said step of receiving and extracting said digital data further comprises the step of converting the extracted data corresponding to the effective picture screen into serial data.

7. An automatic contrast correction method according to claim 5, wherein the step of receiving and extracting said digital data further comprises the step of setting a magnitude of the effective picture screen.

8. An automatic contrast correction method according to claim 5, wherein in the step of amplifying, if said average value is smaller than said reference value, said amplification factor is relatively made to be large, while if said average value is larger than said reference value, said amplification factor is relatively made to be small.

* * * * *